United States Patent
Noonan et al.

(10) Patent No.: US 6,220,366 B1
(45) Date of Patent: Apr. 24, 2001

(54) WHEEL CONTROL STRUCTURE FOR A FOLDING IMPLEMENT

(75) Inventors: James Thomas Noonan, Johnston; Paul David Parker, Ottumwa; David Alan Payne, Urbandale; Brian Thomas Mosdal, Ankeny, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/634,396

(22) Filed: Aug. 9, 2000

(51) Int. Cl.[7] .................................................. H01B 73/02
(52) U.S. Cl. .............................................. 172/311; 701/50
(58) Field of Search ................................ 172/311, 239, 172/4, 2; 701/50

(56) References Cited

U.S. PATENT DOCUMENTS

| | | | |
|---|---|---|---|
| 4,700,784 | 10/1987 | Wiebe et al. | 172/126 |
| 4,867,245 | 9/1989 | Stevens | 172/311 |
| 4,974,684 | 12/1990 | Stevens | 172/311 |
| 5,957,218 | 9/1999 | Noonan et al. | 172/239 |

*Primary Examiner*—Christopher J. Novosad

(57) ABSTRACT

A multi-section implement frame includes outer wing sections which fold relative to inner wing sections and then over a main center frame to a transport position. The wing sections include selectively extendable and retractable structure such as lift wheel assemblies which, if extended in the transport position, can interfere with each other. Transducers detect the position of the inner wing sections during folding and unfolding and provide signals to an implement control unit (ICU) to automatically operate the lift wheel assemblies to prevent interference during folding and unfolding and to assure the lift wheels are extended before the implement frame reaches the fully unfolded position. Proximity switches supported above the center frame or other transducer devices such as mercury switches on the wing sections responsive to section angle provide the signals to the ICU. During folding, the ICU causes the lift structure to retract after both switches are activated. During unfolding, the lift structure is extended only after there is no longer potential interference between components. Extension of the lift assemblies during unfolding is controlled by the ICU so that the frame is generally level in the fully unfolded position. The outer wing sections can be folded to narrow the machine when the ground is difficult to penetrate or when a narrow working width is required while still retaining implement operation under the control of the ICU.

22 Claims, 4 Drawing Sheets

WHEEL CONTROL STRUCTURE FOR A FOLDING IMPLEMENT

BACKGROUND OF THE INVENTION

1) Field of the Invention

The present invention relates generally to agricultural implements and, more specifically, to folding implements with vertically movable ground support wheels or other vertically movable elements.

2) Related Art

Folding implement frames are widely used for agricultural applications to provide a wide field-working width and a narrower transport width. Some implements have tool-carrying frames with five sections or more, including outermost wing sections that fold over corresponding inner wing sections for transport. The inner wing sections are hinged to a main frame section so that the folded inner wing/outer wing combination on each side of the implement can be folded to an upright transport position. In the transport position, tools and lift wheel assemblies on the opposite outermost wing sections are in close proximity to each other over the central portion of the main frame. The lift wheel assemblies or other vertically adjustable components on the outermost wing sections, if not fully retracted or moved to a particular storage position, can interfere with each other as the sections are moved towards their final transport positions. Such interference can result in component damage and limit the pivoting of the frame sections so that transport width is not minimized. In addition, the lift assemblies projecting outwardly from the inner wing sections in the transport position can increase the transport width and move the center of gravity of the sections outwardly.

Various devices have been employed to prevent interference, such as mechanical locks for wheel assemblies of the type shown in U.S. Pat. No. 4,974,684 assigned to Deere & Company. Relatively complex hydraulic control circuits such as shown in U.S. Pat. No. 4,700,784 have also been devised. However, these have not been entirely effective and are not readily adaptable to automatic control systems utilizing an implement control unit (ICU) which provides individual control of implement lift cylinders of the type shown in U.S. Pat. No. 5,957,218 also assigned to Deere & Company.

BRIEF DESCRIPTION OF THE INVENTION

It is therefore an object of the present invention to provide an improved folding system for a multi-sectioned implement having wing sections with lift wheels or other vertically adjustable members. It is another object to provide such a system wherein structure located on adjacent sections is automatically moved to non-interfering locations as the sections are moved towards a folded transport position. It is yet another object to provide such a system with a center of gravity closer to the center of the implement for increased stability in transport.

It is a further object of the invention to provide an improved folding system for a multi-sectioned implement having wing sections. It is yet another object to provide such a system which facilitates a narrow transport width and improved center of gravity by controlling the lift wheels or other vertically adjustable members as the implement is folded to a transport position.

A further object of the present invention is to provide an improved folding system for a multi-sectioned implement having a controller for automatic height and/or level control, wherein the controller is advantageously utilized to move components on the implement sections to facilitate a narrow transport width. It is another object to provide such a system with a simple wing fold position detection structure connected to the controller, wherein the detection structure can include numerous types of sensors including mechanically operated switches, mercury or proximity switches, or rotary or linear potentiometers.

Accordingly, a folding system for a multi-sectioned implement such as a five section field cultivator or chisel plow includes wing-fold structure for folding the two outermost wing sections with lift wheel assemblies over corresponding inner wing sections. Inner wing-fold structure then is activated to pivot the two inner wing sections with the folded outer wings upwardly and inwardly towards each other over a central main frame. A proximity switch or other simple inner wing position indicating device is positioned to provide a fold condition signal to a controller that in turn provides lift signals to lift wheel modules on the wing sections. As each inner wing/outer wing pair approach a preselected position between a fully extended position and a fully folded position, the indicating device provides the signal. When both folded wing pairs pass the preselected position, the controller sends a signal to an electrohydraulic control valve connected to the lift wheel assemblies (or other vertically adjustable components on the implement) to retract the lift wheels to a predetermined position and thereby prevent interference between the wheels on the folded pairs as the sections approach each other over the main frame and move the center of gravity inwardly for increased transport stability.

As the folded wing pairs are pivoted outwardly and downwardly from the transport position, the wing position indicating device provides a signal to the controller. When a signal is received at the controller, indicating that the wheel modules are no longer in a position of interference, the controller causes the electrohydraulic control valve to move the lift wheel modules to an extended position for supporting the wings above the ground in preselected position. In the preferred embodiment, the wing wheel modules on one side of the implement extend only after the indicating device for that side of the implement provides a position signal.

The switching arrangement assures that the lift wheel assemblies will not be retracted until both outer wing sections are lifted from the ground. The arrangement also assures that the wheel assemblies for each side of the implement will be extended before the corresponding wing frames approach the fully unfolded position. The system is simple and easy to implement, and the switches reliably provide position signals to the ICU. The controller can match the extended position of the lift wheels on the wing sections to the position of the lift wheel assemblies on the main frame so the implement is level when fully unfolded. By having the switches mounted between the mainframe and the inner wing, the operator has the option of using a five-section machine as a three-section machine in narrow areas or hard ground conditions by simply folding the outer wings. The wheel modules will operate correctly despite the fact that the outer wings are not doing any work. The system can also be used to control other lift assemblies on the wing sections, such as implement gangs or row units, to prevent interference when the sections are folded to a transport position and to properly position the assemblies as they are moved to the field-working position.

These and other objects, features and advantages of the present invention will become apparent to one skilled in the art upon reading the following detailed description in view of the drawings.

BRIEF DESCRIPTION OF THE DRAWINGS

FIG. 2a is an enlarged view of the circled area of FIG. 2 including the wing position switch.

DETAILED DESCRIPTION OF THE DRAWINGS

Figure 1:
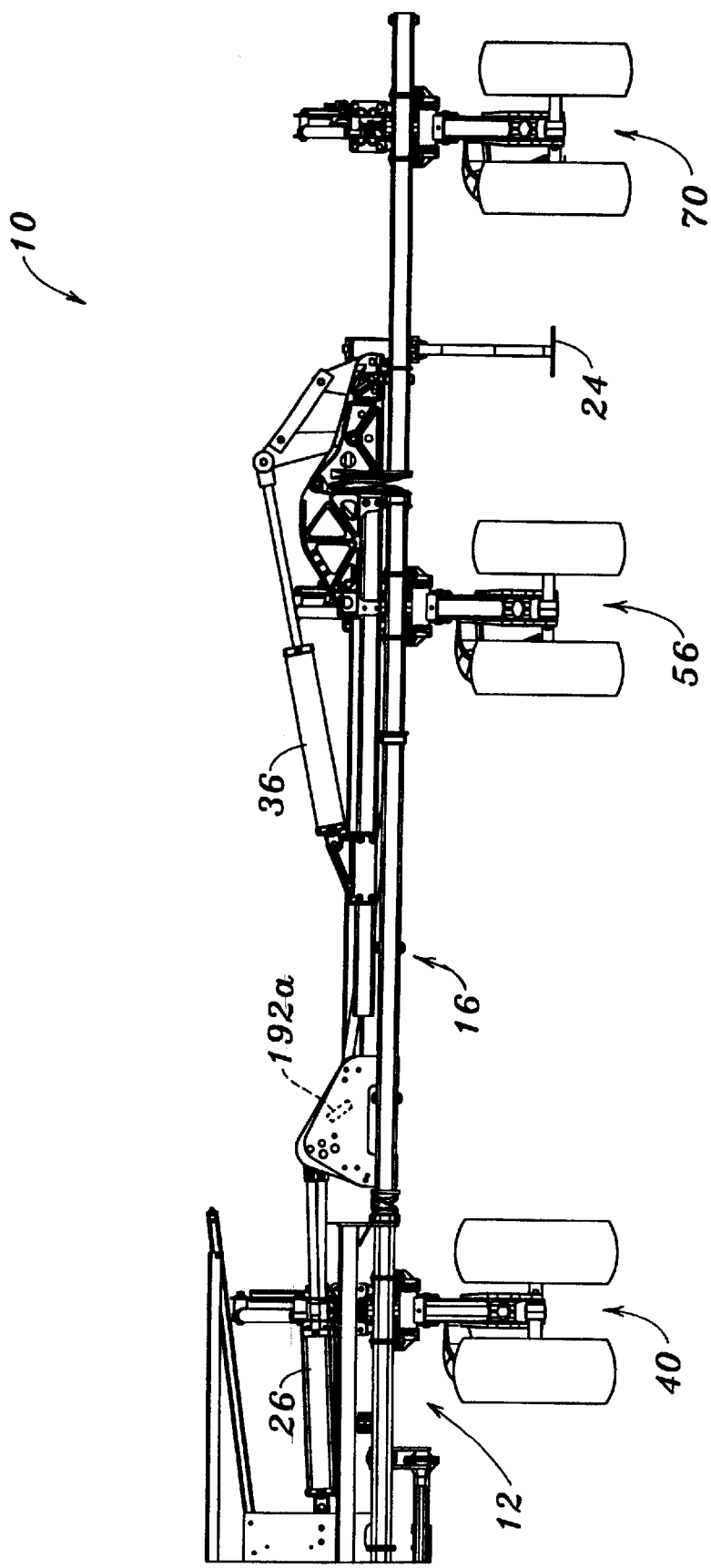
FIG. 1 is a rear view of the right half of a five-section implement with the frame in the unfolded position.
Figure 2:
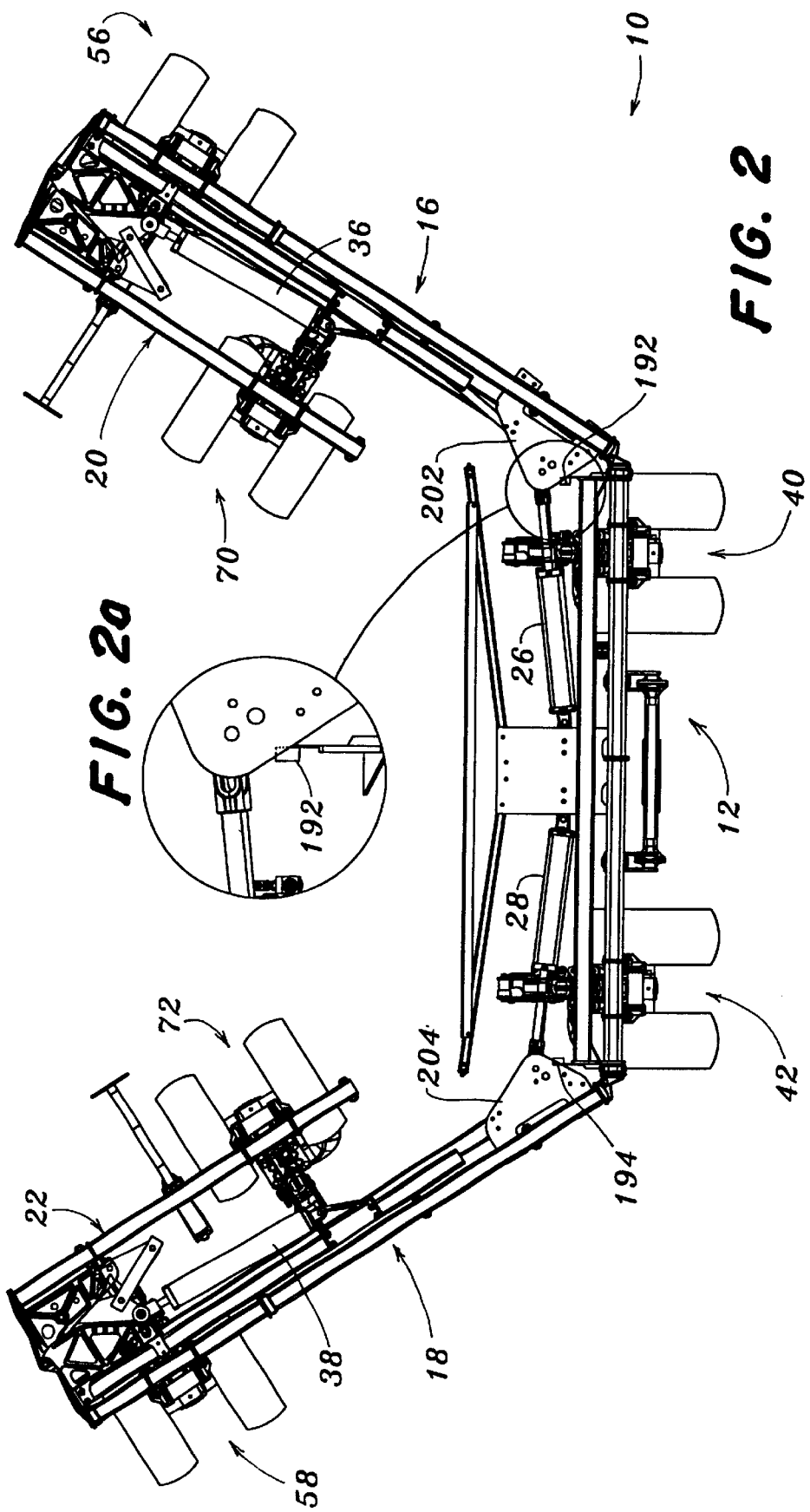
FIG. 2 is a view of the implement of FIG. 1 showing the entire frame partially folded between the field-working position and a transport position.

Referring now to FIGS. 1 and 2, therein is shown an implement frame 10 for a field cultivator or chisel plow or other multi-section folding implement. The frame 10 includes a main or center frame 12, inner wing frames or sections 16 and 18 pivotally connected inner ends to opposite sides of the center frame 12, and outer wing frames or sections 20 and 22 pivotally connected to the outer ends of the sections 16 and 18, respectively. The frames support a plurality of earthworking tools 24, some of which are removed in the drawing figures for simplicity.

Figure 3:
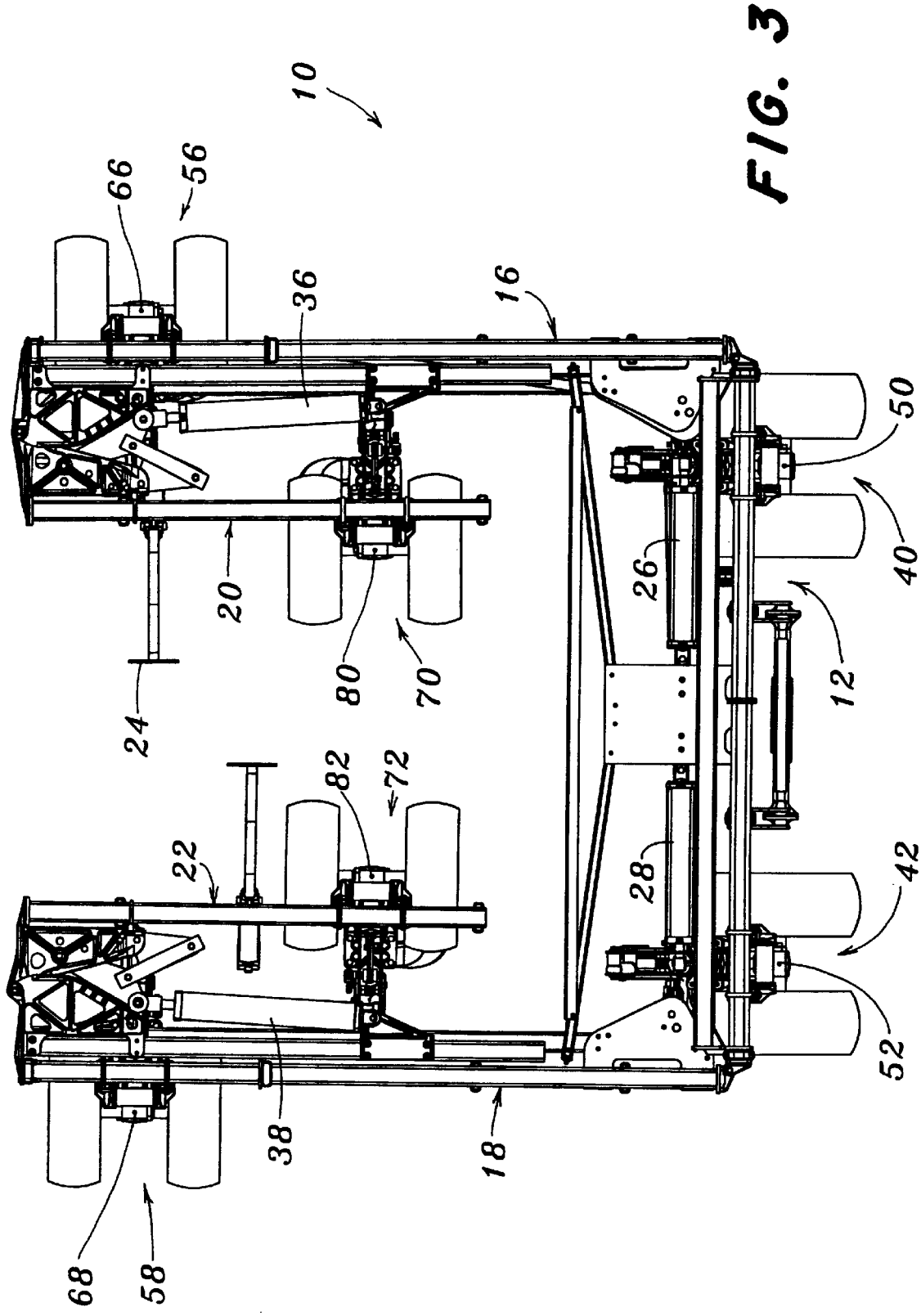
FIG. 3 is a view of the implement of FIG. 1 with the frame in the fully folded transport position.

Inner wing fold cylinders 26 and 28 are connected between the center frame 12 and the inner wing sections 16 and 18. The cylinders 26 and 28 are connected to a conventional control valve on the towing vehicle (not shown) for selectively extending and retracting the cylinders and pivoting the sections 16 and 18 between the fully unfolded field-working position (FIG. 1) and the folded transport position (FIG. 3). Outer wing fold cylinders 36 and 38 are connected between the respective inner wing sections 16 and 18 and the outer wing sections 20 and 22 to pivot the sections 20 and 22 between unfolded positions (FIG. 1) and folded positions (FIG. 2) approaching a parallel relationship with the sections 16 and 18 prior to the pivoting of the sections 16 and 18 to the transport position (FIG. 3). The outer wing fold cylinders 36 and 38 are also connected to control valve on the tractor for extension and retraction. The hydraulic system assures that the outer wing sections 20 and 22 fold over the inner wing frames 16 and 18 prior to the inner wing frames pivoting upwardly into the transport position. During unfolding, the inner wing frames 16 and 18 pivot downwardly to their field-working positions prior to the outer wing frames 20 and 22 unfolding from their transport positions generally parallel to the frames 16 and 18.

Lift wheel assemblies 40 and 42 support the center frame 12 above the ground and include double acting cylinders 46 and 48 connected to wheel support arms 50 and 52, respectively, which are pivotally connected to the center frame 12. Lift wheel assemblies 56 and 58 support the inner wing frames 16 and 18 in the field-working position and include double acting cylinders 62 and 64 connected to wheel support arms 66 and 68 pivotally connected to the respective wing frames 16 and 18. The outer wing frames 20 and 22 are supported in the field-working position by lift wheel assemblies 70 and 72 including double acting cylinders 74 and 76 connected to wheel support arms 80 and 82.

When the frame 10 is unfolded, the lift assemblies 40, 42, 56, 58, 70 and 72 move the frame between a raised position wherein the tools 24 are offset a substantial distance above the ground (FIG. 1) and lowered ground engaging positions wherein the tools 10 penetrate the ground. In the lowered ground engaging positions, the wheel assembly cylinders can be extended or retracted to adjust the depth of penetration of the tools 24 from a shallow skimming position to a lowermost deep tillage position. The wheel assembly cylinders can be adjusted in any working frame position to vary one or more of the wing positions relative to the position of the center section 12 and to level the frame or vary section height from side-to-side. Additional independently controlled lift wheel assemblies can be offset in the fore-and-aft direction from those shown in the figures so that the frame leveling can be adjusted front to rear.

Figure 4:
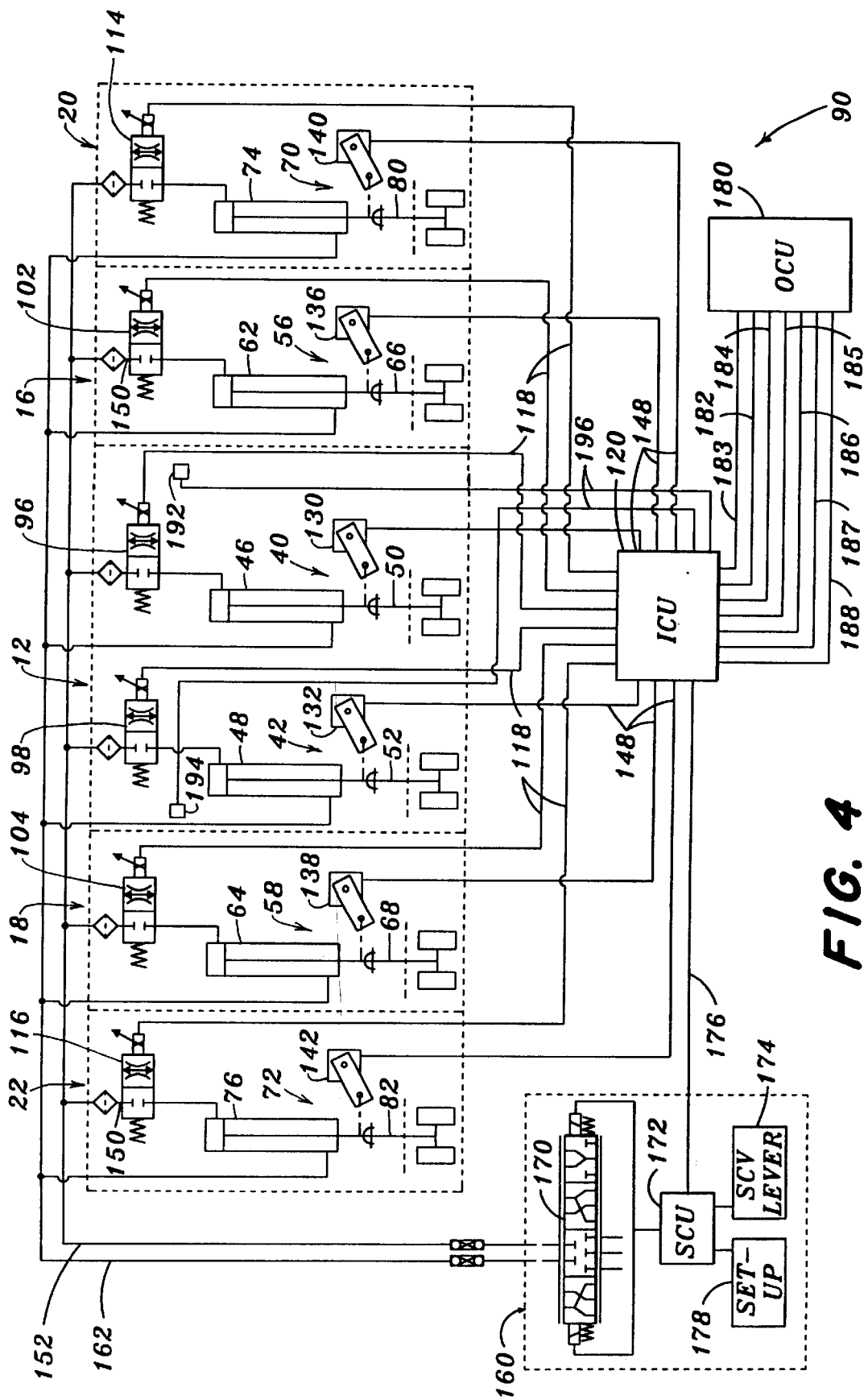
FIG. 4 is a schematic of the control system for the implement of FIG. 1 including the transducers utilized for detecting implement frame fold condition and providing position signals to an implement control unit (ICU).

Referring now to FIG. 4, a lift control system 90 is shown and includes individual two position, two way proportional electrohydraulic control valves 96 and 98 connected to the lift assembly cylinders 46 and 48 for controlling the lift assemblies 40 and 42 to position the center section 12 relative to the ground. Electrohydraulic control valves 102 and 104 are connected to the cylinders 62 and 64 for controlling the inner wing section lift assemblies 56 and 58 to position the inner wing sections 16 and 18 relative to the ground while in the field-working position and to control lift assembly position during the folding and unfolding cycle. Similarly, electrohydraulic control valves 114 and 116 are connected to the cylinders 74 and 76 to position the outer wing sections 20 and 22 relative to the ground while the sections are in the field-working position and to control lift assembly position during the folding and unfolding cycle.

The control terminals on the valves 96, 98, 102, 104, 114 and 116 are connected by lines 118 to outputs of an implement control unit (ICU) 120 generally of the type described in the aforementioned U.S. Pat. No. 5,957,218. Lift assembly position transducers 130, 132, 136, 138, 140 and 142 operably associated with the respective lift wheel assemblies 50, 52, 66, 68, 80 and 82 provide lift assembly position signals via lines 148 to the ICU 120 dependent upon cylinder extension and retraction. As shown, the transducers 130–142 are connected to provide an indication of cylinder extension which is directly related to the position of the respective wheel arms 50, 52, 66, 68, 80 and 82. However, other types of sensors may be used to provide indications of position.

As shown in FIG. 4 the valves 96, 98, 102, 104, 114 and 116 are proportional valves, each having an input port 150 connected to a hydraulic line 152 and an input port connected to the base end of the corresponding one of the lift assembly cylinders 46, 48, 62, 64, 74 and 76. The line 152 is selectively connected to a source of hydraulic fluid under pressure on the towing vehicle through a first output of a control valve assembly indicated generally at 160. A second hydraulic line 162 is connected to a second output of the valve assembly 160 and to the rod end of each of the cylinders 46, 48, 62, 64, 74 and 76.

The control valve assembly 160 includes a four-position selective control valve (SCV) 170 having extend, block, retract and float positions and shown in the block position in FIG. 4. The valve 170 is connected to a selective control unit (SCU) 172 which is controlled by a manually actuated lever 174 in the cab of the towing vehicle and a valve signal output line 176 from the ICU 120. The SCU 172 is also connected to a set-up control 178 for establishing initial reference and set points for the particular implement and towing vehicle combination. The SCV lever 174 has implement raise, lower, hold, and float positions, as well as an automatic height/depth control position wherein the ICU automatically controls the valve 170 and the valves 96–116 to maintain a preselected frame position and/or depth of penetration of the tools 24 during field-working operations. The SCU 172 is responsive to the lever position and the ICU output on the line 176 to move the valve 170 to the proper position for providing the selected function, and the ICU 120 controls the valves 96–116 in accordance with inputs from the lines 148 and 176 and from an operator control unit (OCU) 180 to provide individual cylinder hold, extension or retraction functions. The ICU 120 also controls cylinder speed (i.e., hydraulic fluid flow rate) for the selected function. The SCV structure 160 is preferably of the type utilized with the commercially available 8000/8000 TEN/9000 series John Deere tractors. The system meters in and meters out flow from the base end of the cylinders. The tractor proportional valve provides the flow direction and total flow to all the lift assembly cylinders. It is to be understood that other types of implement control systems that provide lift assembly control for the assemblies 56, 58 and 70, 72 may by utilized with the present invention and that the details of the lift control system 90 are given here primarily for background information.

The OCU 180 includes conventional operator controls for providing control inputs to the ICU 120, including a depth voltage signal over line 182 for implement depth control, an intermediate depth signal over line 183 to provide a preselected secondary depth setting (additional pre-set depth settings may also be provided as necessary), and wing depth offset signals over lines 184 and 185, respectively for adjusting the inner and outer wings relative to each other and to the main frame. A main frame level output signal via line 186 and an offset disable signal via line 187 are also provided to the ICU 120. Power to the OCU 180 is supplied by a power line 188. Reference may be had to the aforementioned U.S. Pat. No. 5,957,218 for a more detailed discussion of lift, depth control and frame leveling features.
Description of the Lift Assembly Position Control In addition to normal control inputs from the OCU 180 and the lift assembly transducers 130–142, the ICU 120 receives wing position signals from wing position sensing elements 192 and 194 on the implement frame via lines 196 as the wing sections are moved between the field-working (FIG. 1) and transport (FIG. 3) positions. As shown in FIGS. 2 and 2a, the elements 192 and 194 are transducers or switches such as magnetic reed switches supported near the hinge area of the main frame 12 and responsive to the movement of a portion of metal hinge structure 202 and 204 into close proximity to a switch. It is to be understood that the elements 192 and 194 may be any of a variety of sensors including but not necessarily limited to reed switches or inductive proximity sensors, and mercury switches, inclinometers and rotary potentiometers connected to a wing section (see, for example, 192a of FIG. 1).

When the right inner wing frame 16 is folded and reaches a preselected position, shown in FIG. 2 as approximately forty-five degrees from the horizontal, the hinge portion 202 moves adjacent the element 192 to close the reed switch and provide a right wing position signal to the ICU 120. The switch remains closed when the wing section 16 is anywhere in the range of folded positions between the preselected position and the transport position. The element 194 acts in a similar manner in response to the close proximity of the hinge portion 204 to provide a left wing position signal to the ICU 120 when the wing 18 is anywhere between the preselected position of about forty-five degrees and the fully folded transport position. The elements 192 and 194 may be gravity actuated switches or potentiometers connected to the wing sections such that each changes state or output level when the corresponding wing section reaches a preselected angle relative to the horizontal. Mechanically actuated switches may also be utilized, and the actual angle of the wing sections at which the position signal is provided may be varied. The angle of activation of the switch or output level of the transducer is chosen to assure that the position signal is provided ICU 120 before the lift assemblies 70 and 72 start interfering with each other during folding of the implement 10.

When the implement frame is folded from the working position shown in FIG. 1 towards the transport position of FIG. 3, the outer wing frames 20 and 22 are first pivoted relative to the inner wing frames 16 and 18 by retracting the fold cylinders 36 and 38. Thereafter, the inner wing fold cylinders 26 and 28 are retracted to pivot the wing frame pairs 16, 20 and 18, 22 upwardly relative to the main frame 12 about the pivots of the hinges structures 202 and 204. As soon the ICU 120 receives wing position signals from both of the elements 192 and 194 indicating that both wing pairs are pivoted to or beyond the preselected position and the lift assemblies 70 and 72 may soon come into an interfering relationship directly adjacent each other, the ICU 120 activates the valves 114 and 116 and assures that the control valve assembly 160 has pressurized the line 162 to retract the cylinders 74 and 76 which causes the assemblies 70 and 72 to retract or tuck in with respect to the wing frames 20 and 22. The wing sections then can fold completely to a compact configuration over the main frame 12 (FIG. 3) with no interference between lift assemblies. Also when the fold signals are provided to the ICU 120, the ICU activates the valves 102 and 104 to also retract or tuck in the lift assemblies 56 and 58 to reduce the transport width of the implement 10 and move the center of gravity of the sections closer to the center of the implement for greater stability.

During unfolding of the implement 10 from the transport position of FIG. 3 towards the working position of FIG. 1, the ICU 120 continually monitors the state of the elements 192 and 194. The inner wing cylinders 26 and 28 are first extended to pivot the wing frame pairs 16, 20 and 18, 24 downwardly. As soon as one of the elements 192 or 194 changes state or output level indicating that the wing wing pair on one side of the implement 10 is pivoted beyond the location wherein interference can occur between the lift frame assemblies 70 and 72, the ICU 120 causes the corresponding lift assemblies on that side to extend by activating the valve assembly 160 to pressurize the line 152 and activating the corresponding two of the control valves 102, 104, 114 and 116 to move from the blocking position and apply pressurized fluid to the base end of the cylinders on that side to extend the cylinders. When the wing frames on the opposite side of the implement reach the preselected position, the second one of the elements 192 or 194 provides the position signal to the ICU 120 to extend the lift assemblies for that side. The ICU 120 also monitors the output signals from the lift assembly position transducers 130, 132,136, 138,140 and 142 and operates the corresponding lift cylinders to move the lift assemblies to positions wherein the implement 10 will be generally level across its width when completely unfolded (FIG. 1). As soon as the inner wing frames 16 and 18 are completely unfolded, the outer wing sections 20 and 22 are pivoted outwardly and downwardly by extending the cylinders 36 and 38. The operator can enter the desired set points for the lift assemblies using the OCU 180 so the implement is leveled with the tools 24 located a preselected distance above the ground upon unfolding. Once the set points are entered, level position will be automatically attained each time the implement 10 is unfolded without need for further operator input.

Having described the preferred embodiment, it will become apparent that various modifications can be made without departing from the scope of the invention as defined in the accompanying claims.

What is claimed is:

1. A folding agricultural implement having a transversely extending central frame supported a distance above the ground, wing sections pivotally supported from opposite outer ends of the central frame for movement between an outwardly extending field-working position and a folded transport position over the central frame, lift assemblies connected to the wing sections and movable between extended working and retracted positions, the lift assemblies projecting towards each other when the wing sections are in the folded transport position, an implement control unit connected to the lift assemblies and controlling extension and retraction of the lift assemblies, wing position transducers connected to the implement control unit and responsive to movement of the wing sections between the field-working and transport positions and providing position signals to the implement control unit, and wherein the implement control unit is responsive to the position signals to retract the lift assemblies prior to the wing sections reaching the folded transport position to thereby prevent lift assembly interference in the transport position.

2. The implement as set forth in claim 1 wherein the implement control unit is responsive to the signals to retract the lift assemblies when the wing sections are pivoted beyond a preselected fold position during movement towards the transport position.

3. The implement as set forth in claim 1 wherein the implement control unit is responsive to the signals to extend the lift assemblies as the wing sections are pivoted beyond a preselected unfold position during movement towards the field-working position.

4. The implement as set forth in claim 1 wherein the implement control unit is responsive to the signals to retract the lift assemblies only when all the wing sections are pivoted beyond a preselected fold position during movement towards the transport position.

5. The implement as set forth in claim 1 wherein the wing position transducers comprise proximity switches supported from the central frame.

6. The implement as set forth in claim 1 wherein the wing position transducers comprise inclination responsive switches connected to the wing sections.

7. The implement as set forth in claim 1 including a transducer providing an indication of the position of the central frame relative to ground level, and wherein the control unit is responsive to the position signals to cause the lift assemblies to extend to positions dependent on the central frame position indication.

8. A folding agricultural implement having a transversely extending central frame supported above the ground, first and second inner wing sections pivotally supported from opposite outer ends of the central frame for movement between an outwardly extending field-working position and a folded transport position over the central frame, first and second outer wing sections pivotally connected to the first and second inner wing sections, respectively, and pivotable between outwardly directed working positions and compact positions generally overlying the inner wing sections, lift wheel assemblies connected to the first and second outer wing sections and movable between extended ground support and retracted positions, the lift wheel assembly on the first outer wing section projecting towards the second outer wing section when the inner wing sections are in the folded transport position and the outer wing sections are in the compact positions, an implement control unit connected to the lift wheel assemblies and controlling extension and retraction of the lift wheel assemblies, wing position transducers connected to the implement control unit and responsive to movement of the first and second inner wing sections between the field-working and transport positions and providing position signals to the implement control unit, and wherein the implement control unit is responsive to the position signals and operates the lift wheel assemblies during movement of the inner wing sections to move the wheel assemblies out of interfering relationship prior to the first and second inner wing sections reaching the transport position.

9. The implement as set forth in claim 8 wherein the implement control unit is responsive to the signals to retract the lift wheel assemblies on the first inner wing section and the first outer wing when the first inner wing section is pivoted beyond a preselected fold position during movement towards the transport position.

10. The implement as set forth in claim 8 wherein the implement control unit is responsive to the signals to extend the lift wheel assemblies on the first inner wing section and first outer wing section when the first inner wing section is pivoted beyond a preselected first unfold position, and to extend the lift wheel assemblies on the second inner wing section and second outer wing section when the second inner wing section is pivoted beyond a preselected second unfold position during movement towards the field-working position.

11. The implement as set forth in claim 10 wherein the implement control unit is responsive to the signals to retract the lift wheel assemblies on the first inner and outer wing sections only after the first inner wing section is pivoted beyond a preselected unfold position during movement towards the transport position.

12. The implement as set forth in claim 8 wherein the wing position transducers comprise proximity switches supported from the central frame.

13. The implement as set forth in claim 8 wherein the wing position transducers comprise inclination responsive switches connected to the inner wing sections.

14. The implement as set forth in claim 8 wherein the implement includes a central frame lift wheel assembly operable independently of the lift wheel assemblies connected to the wing sections.

15. The implement as set forth in claim 14 wherein the implement control unit is connected to the central lift wheel assembly and controls extension and retraction of the lift wheel assemblies and central lift wheel assembly to level the central frame and wing sections as the wing sections approach the outwardly directed working positions.

16. The implement as set forth in claim 8 wherein, when the outer wing sections are in the compact positions with the inner wings in the outwardly extending field-working position, the implement control unit controls extension and retraction of the lift wheel assemblies on the inner wing sections so the implement can be operated in the field in a narrowed configuration.

17. A multi-section implement supporting earthworking tools and having a plurality of lift assemblies, folding structure connected to the sections and operable to move the sections between extended field-working positions and folded transport positions, an implement control unit connected to the lift assemblies and controlling the lift assemblies for maintaining the tools in preselected positions relative to the ground when the sections are in the field-working positions, transducer structure connected to the implement control unit providing a fold signal in response to the movement of the sections between the field-working and transport positions, and wherein the implement control unit is responsive to the fold signal to operate the lift assemblies to move the lift assemblies to a retracted position when the folding structure is operated to move the sections to the folded transport positions and to an extended position when the folding structure is operated to move the sections to the extended field-working positions.

18. The implement as set forth in claim 17 wherein the transducer structure is responsive to the movement of at least one of the sections to a preselected angle relative to the horizontal.

19. The implement as set forth in claim 17 wherein the lift assemblies include independently adjustable cylinders, and wherein the implement control unit adjusts the cylinders relative to each other as the folding structure is operated to provide a preselected implement position when the sections reach the field-working positions.

20. The implement as set forth in claim 19 wherein the lift assemblies comprise lift wheel assemblies, and wherein the preselected implement position is a generally level condition with the tools located above the ground.

21. A multi-section implement including a main frame section and wing frame sections hinged to the main frame section, the sections supporting earthworking tools and having a plurality of lift assemblies having extended and retracted positions, folding structure connected to the wing frame sections and operable to move the wing frame sections between a transversely extended field-working position and a folded transport position over the main frame with the wing frame sections in close proximity to each other, wherein the lift assemblies, in the extended positions, are in an interfering relationship when the wing frame sections are in the transport position, an implement control unit (ICU) connected to the lift assemblies and controlling the lift assemblies for maintaining the tools in preselected positions relative to the ground when the wing frame sections are in the field-working positions, means responsive to movement of the sections between the field-working and transport positions for providing a fold condition signal to the ICU, and wherein the ICU is responsive to the fold condition signal for moving the lift assemblies towards the retracted position to prevent the interfering relationship when the wing frame sections are pivoted over the main frame and towards the extended position when the wing frames are pivoted back towards the field-working position.

22. The implement as set forth in claim 21 wherein the wing frame sections comprise first and second inner wings connected to the main frame section, and first and second outer wings connected to the first and second inner wings, respectively, and wherein the first and second outer wings are foldable over the first and second inner wings, respectively, and wherein the ICU facilitates automatic depth control of earthworking tools on the inner wings and main frame section when the outer wings are folded, thereby allowing the implement to operate in a narrowed condition.

* * * * *